J. A. LOWE.
WHEEL.
APPLICATION FILED SEPT. 2, 1911.

1,056,107.

Patented Mar. 18, 1913.

2 SHEETS—SHEET 1.

Witnesses:
Otto W. Holmgren
F. George Barry

Inventor:
James A. Lowe
by his attorneys

J. A. LOWE.
WHEEL.
APPLICATION FILED SEPT. 2, 1911.

1,056,107.

Patented Mar. 18, 1913.

2 SHEETS—SHEET 2.

Witnesses:
Otto W. Holmgren
J. George Barry

Inventor:
James A. Lowe
by his attorneys

UNITED STATES PATENT OFFICE.

JAMES A. LOWE, OF NORTH BRANCH, NEW JERSEY.

WHEEL.

1,056,107. Specification of Letters Patent. Patented Mar. 18, 1913.

Application filed September 2, 1911. Serial No. 647,391.

*To all whom it may concern:*

Be it known that I, JAMES A. LOWE, a citizen of the United States, and resident of North Branch, in the county of Somerset and State of New Jersey, have invented a new and useful Improvement in Wheels, of which the following is a specification.

My invention relates to a wheel and more particularly to a wheel in which the hub which receives the axle is yieldingly attached to the rim.

Figure 1:
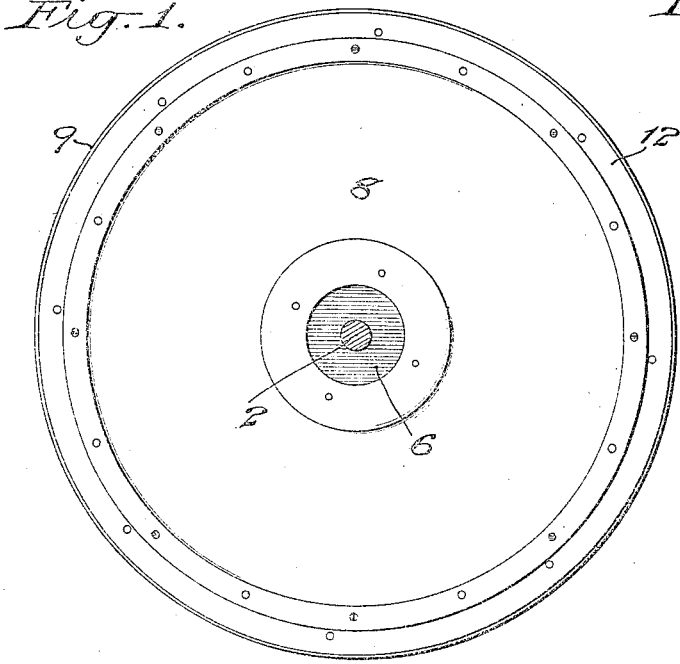
Figure 2:
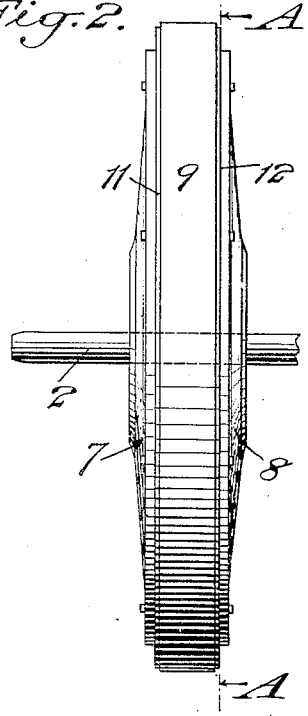
Figure 3:
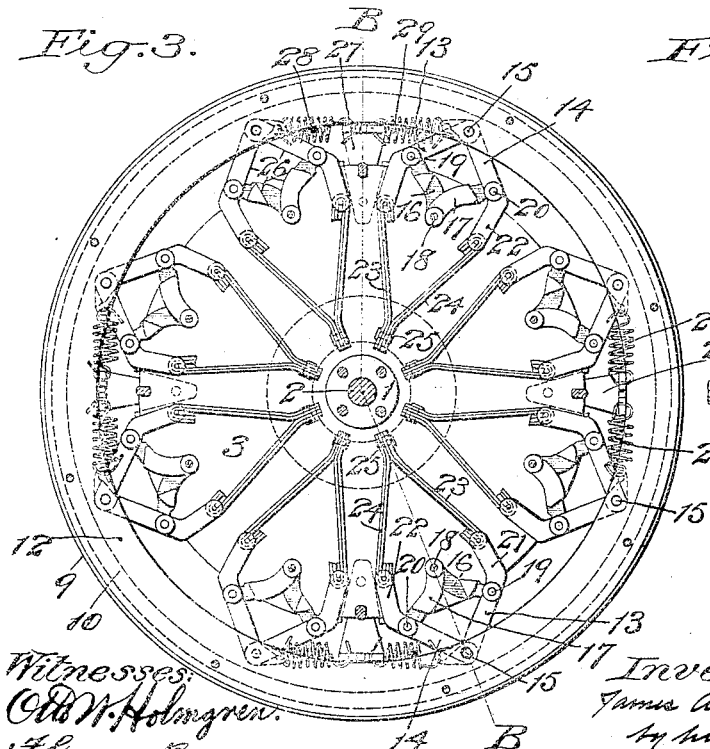
Figure 4:
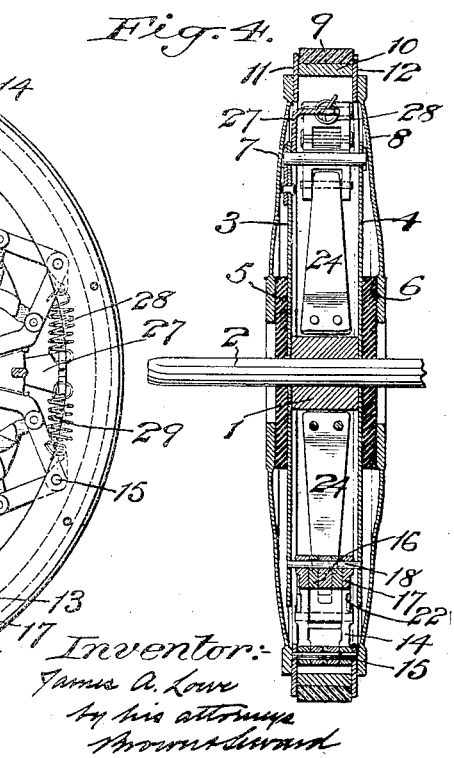
Figure 5:
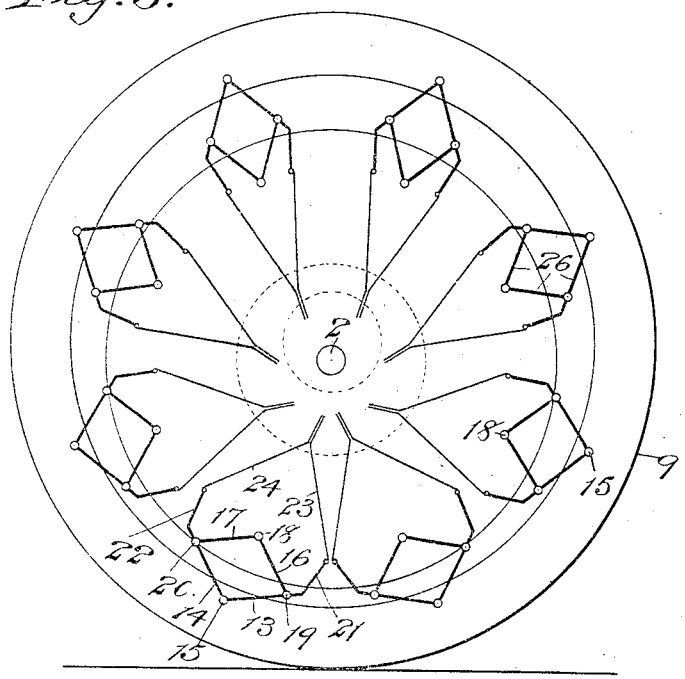
Figure 6:
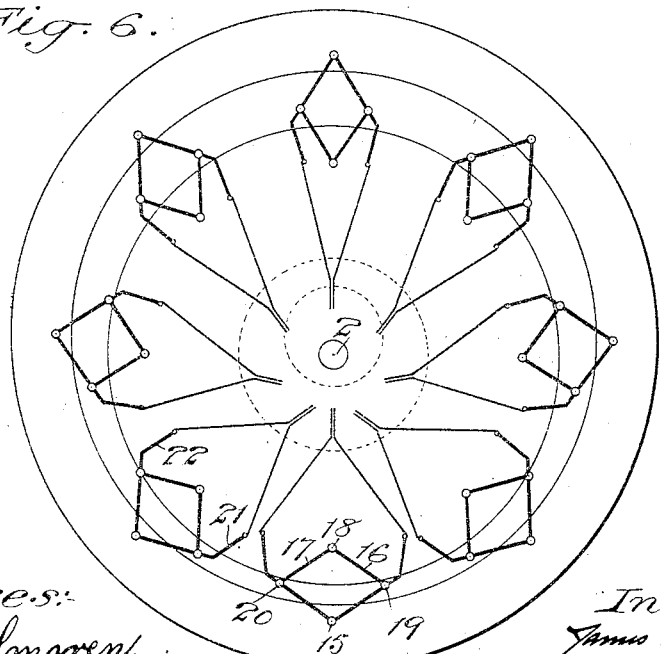

A practical embodiment of the invention is represented in the accompanying drawings in which, Figure 1 is a view of the wheel in side elevation, Fig. 2 is a view in face elevation, Fig. 3 is a section in the plane of the line A—A of Fig. 2, Fig. 4 is a transverse section in the plane of the line B—B of Fig. 3, Figs. 5 and 6 are diagrammatic views showing two different positions which the parts assume under load.

The hub of the wheel is denoted by 1 and may be suitably formed to receive an axle, denoted by 2. The hub has secured to its opposite ends, disks 3 and 4, one to each end, and outside of the disks 3 and 4 and spaced therefrom by means of intermediate spacing disks 5 and 6, there are secured covers denoted respectively by 7 and 8, for housing the parts which connect the hub yieldingly with the rim.

The tread is denoted by 9. It may be of any suitable material, for example, rubber, secured to the periphery of a rim 10, side flanges 11 and 12 serving to hold the tread 9 in position on the rim 10 and also serve as fastening means for the outer edges of the covers 7 and 8. The flanges 11 and 12 also extend inwardly sufficiently to form an annular housing for the yielding mechanism which moves radially toward and away from the inner face of the rim 10 as the wheel is rotated under its load.

The means for yieldingly connecting the hub with the rim is constructed and arranged as follows. Several sets of double toggles quite similar to one another in their structure and arrangement are employed and a description of one of these will serve for all. A pair of links 13, 14, are pivoted to each other at 15 and a pair of links 16, 17, are pivoted to each other at 18 and to the links 13, 14, the link 16 being pivoted to the link 13 at 19 and the link 17 being pivoted to the link 14 at 20. The links 13, 14, project inwardly beyond their pivotal points 19 and 20 with the links 16, 17, their inwardly projecting portions being denoted by 21, 22. The inner ends of these inwardly projecting portions 21, 22, are connected by strong bar or plate springs 23, 24, the inner ends of these strong plate or bar springs 23, 24, being united at 25, and the ends of the springs which are connected to the projections 21, 22, having a strong tendency to close, thereby holding the double toggles open, that is, with their pivotal points 15, 18, as widely separated from one another as may be. The pivot at 18 passes through the two disks 3 and 4, securing the links 16 and 17 not only to one another but also to the disks. The pivot at 15 also passes through the flanges 11 and 12, as clearly shown in Fig. 4, thereby locking the links 13, 14, to the flanges 11 and 12, as well as to one another.

The sets of double toggles as hereinabove described are arranged in pairs, the set corresponding to that just described being denoted as a whole by 26. Each member of the pair is connected by a coil spring with a projection from one of the disks 3 and 4. The projection in the present instance is denoted by 27, and is connected with the disk 3. The coil spring connecting the set 26 with the projection 27, is denoted by 28 and the coil spring connecting the set which has been specifically described, is denoted by 29. In the present instance, I have shown four pairs of these sets of double toggles, one pair being arranged diametrically opposite another pair.

It will be observed that when load is placed upon the wheel through the axle 2, the hub with its disks 3 and 4, will have a tendency to become depressed and this will tend to close the sets of double toggles which are directed downward, that is, will tend to bring the pivotal points 15 and 18 toward each other against the tension of the bar or plate springs 23, 24. Such movement of the disks will also tend to carry with them the projection 27 and the ends of the springs connected therewith, which movement is provided for in the space between the flanges 11 and 12. At the same time the sets of double toggles which are directed upward will open, i. e. the pivotal points 15 and 18 will separate.

The coil springs 28, 29, serve to prevent displacement of the sets of double toggles under torsional strain, giving a yielding resistance in a circular path. The wheel as a whole is capable of being made more or less resilient, as the purposes for which it is used may require, by simply varying the strength of the bar or plate springs 23, 24, or the number of sets of double toggles or both. The structure has the further advantage of having the parts which move relative to one another well housed against dust and dirt where they may act freely.

What I claim is:

1. A wheel comprising a rim, a hub, and several sets of spring-actuated double toggles connecting the rim and hub, each set of double toggles consisting of two pairs of links the outer pair being pivotally connected to the rim and the inner pair being pivotally connected to the hub and to the members of the outer pair intermediate their ends, and bar or plate springs having their inner ends connected together and their outer ends connected with the free ends of the outer pair of links.

2. A wheel comprising a rim, a hub, and several sets of spring-actuated double toggles connecting the rim and hub, each set of double toggles consisting of two pairs of links the outer pair being pivotally connected to the rim and the inner pair being pivotally connected to the hub and to the members of the outer pair intermediate their ends, and bar or plate springs having their inner ends connected together and their outer ends connected with the free ends of the outer pair of links, the double toggles being arranged in pairs and oppositely arranged springs yieldingly connecting the rim and hub intermediate said pairs of double toggles for preventing displacement of the toggles under torsional strain.

3. A wheel comprising a rim, a hub, disks secured to the hub and several sets of spring-actuated double toggles connecting the rim and disks, each set of double toggles consisting of two pairs of links, the outer pair being pivotally connected to the rim and the inner pair being pivotally connected to the disks and to the members of the outer pair intermediate their ends, and bar or plate springs having their inner ends connected together and their outer ends connected with the free ends of the outer pair of links.

4. A wheel comprising a rim, a hub, disks secured to the hub and several sets of spring-actuated double toggles connecting the rim and disks, each set of double toggles consisting of two pairs of links, the outer pair being pivotally connected to the rim and the inner pair being pivotally connected to the disks and to the members of the outer pair intermediate their ends, bar or plate springs having their inner ends connected together and their outer ends connected with the free ends of the outer pair of links, the double toggles being arranged in pairs and oppositely arranged springs yieldingly connecting the rim and disks intermediate the said pairs of double toggles for preventing displacement of the toggles under torsional strain.

In testimony, that I claim the foregoing as my invention, I have signed my name in presence of two witnesses, this twenty-eighth day of August 1911.

JAMES A. LOWE.

Witnesses:
  F. GEORGE BARRY,
  C. S. SUNDGREN.